United States Patent Office 3,775,523
Patented Nov. 27, 1973

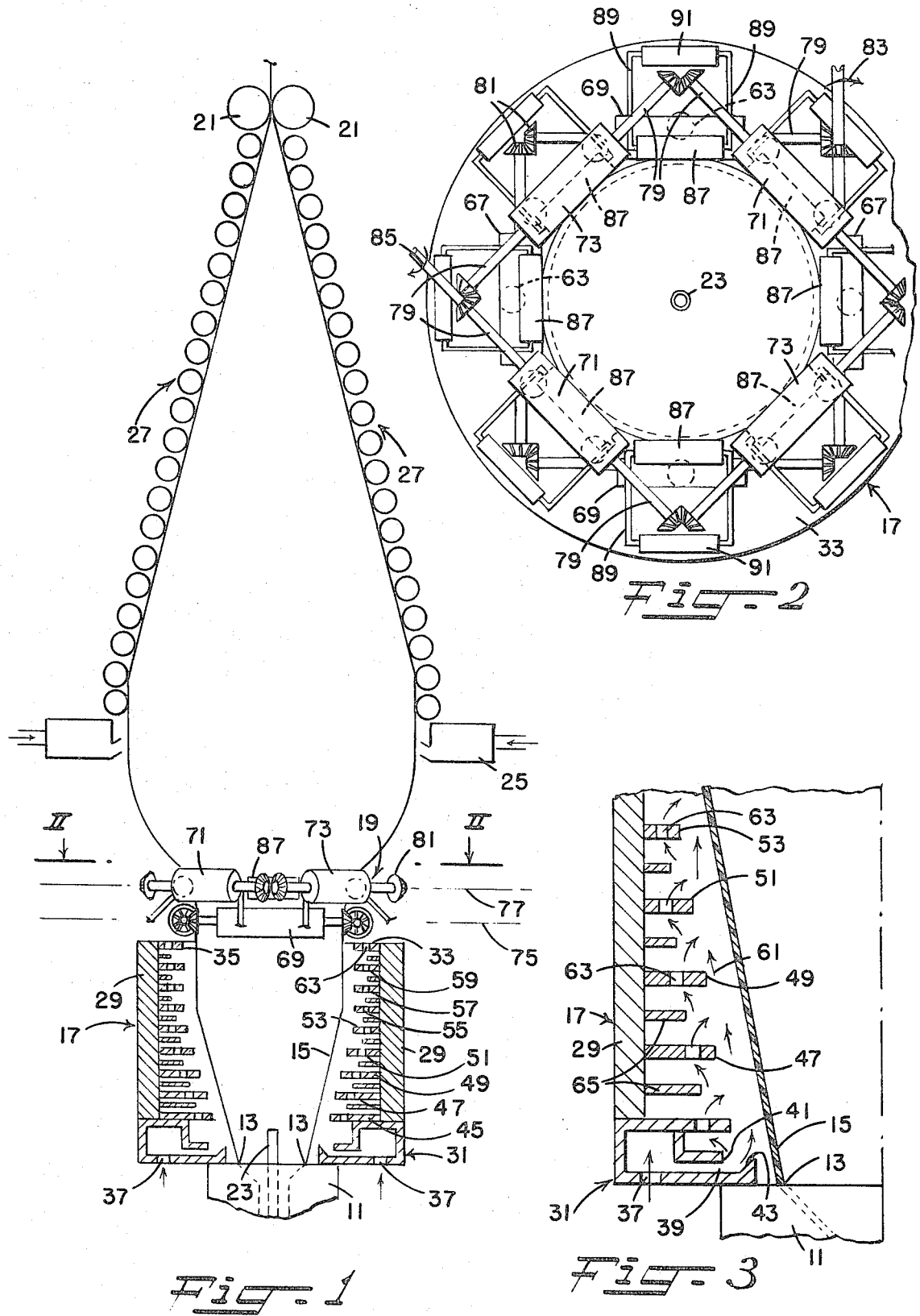

3,775,523
METHOD AND APPARATUS FOR MAKING
ORIENTED TUBULAR FILM
Harold A. Haley, Media, Pa., assignor to FMC
Corporation, Philadelphia, Pa.
Filed Mar. 4, 1971, Ser. No. 120,978
Int. Cl. B29d 7/24, 23/04
U.S. Cl. 264—89                                20 Claims

ABSTRACT OF THE DISCLOSURE

Successive portions of an extruded, advancing tubular film of molten thermoplastic polymeric material are cooled only to within a required orientation temperature range and, while within this temperature range, such portions are stretched to orient the molecules thereof, after which the successive portions are cooled to a temperature below the orientation temperature range while in a stretched condition.

---

The present invention is directed to a method and apparatus for making molecularly oriented tubular films of thermoplastic polymeric materials.

It is well known that a tubular film formed of thermoplastic polymeric material, may be expanded under controlled temperature conditions to orient the molecules thereof and thereby improve the physical properties of such film. For example, U.S. Pat. 2,862,234 discloses a method and apparatus in which an extruded tubular film of molten thermoplastic polymeric material is quenched and then passed between spaced pairs of nip rollers where it is heated to a desired elevated temperature and expanded by a gas under pressure which is contained therein by such pairs of nip rollers.

Flattening and creasing of the tubular film prior to orientation, as is involved in the above-described method, is avoided by a process as disclosed, for example, in U.S. Pat. 3,108,851. This patented process is similar, however, to other known methods in that an extruded tubular film of molten thermoplastic polymeric material is first quenched; that is, cooled to a temperature below a required orientation temperature range, and then reheated and expanded.

More recently issued patents, such as U.S. Pats. 3,141,-912; 3,151,358; 3,217,359; 3,218,380; 3,231,643; 3,231,-652; and 3,231,653, describe methods and apparatus in which flattening and creasing of a tubular film prior to orientation is also avoided. With the methods and apparatus disclosed in these patents, and extruded tubular film of molten thermoplastic polymeric material is also quenched and subsequently reheated to within an orientation tempearture range and stretched, with particular emphasis being directed to control over the reheating of the tubular film and/or the application of the film stretching forces.

Flattening of a tubular film prior to orientation, as described above, often leaves crease lines in the finished film and thus limits its application. On the other hand, quenching of a tubular film of molten thermoplastic polymeric material followed by a reheating of such tubular film for orientation purposes is difficult to control accurately, involves considerable expense and requires a bulky apparatus and a large working space. Accordingly, a primary object of this invention is to provide a new or generally improved and more satisfactory method and apparatus for making molecularly oriented thermoplastic polymeric films.

Another object of this invention is the provision of a method and apparatus in which accurate control is exercised over the temperatures of and the pressures applied to a tubular film of thermoplastic polymeric material during the formation and orientation thereof.

Still another object is the provision of a method and apparatus for making an oriented film of thermoplastic polymeric material without marring or otherwise permanently deforming the same during its manufacture.

A further object is to provide an improved method and apparatus for making thermoplastic polymeric film having a desired, substantially uniform orientation of the molecules thereof.

A still further object of this invention is the provision of an economical, rapid, and accurate method, and a compact and simple apparatus for making oriented tubular films of thermoplastic polymeric materials.

The above and other objects of the invention are achieved by a method and apparatus in which successive portions of an extruded, continuous tubular film of molten thermoplastic polymeric material are cooled within a cooling zone, having an entrance and exit, only to within a necessary orientation temperature range while such successive portions are continuously advanced away from the location of extrusion. Maintained within the tubular film is a gas under a substantially constant pressure which is sufficient to effect a desired radial expansion, and thus molecular orientation, of the successive portions of the tubular film after they leave the cooling zone. The successive portions of the tubular film within the cooling zone are subjected externally to a gas which is under a pressure not greater than that which is exerted by the gas contained within the tubular film to thereby permit at most, a controlled radial expansion and thinning of the walls thereof. The successive molecularly oriented portions of the tubular film are quenched; that is, cooled to a temperature below the orientation temperature range, while in their radially expanded condition and are thereafter collected.

The successive portions of the tubular film issuing from the cooling zone are advanced away from the location of extrusion at a predetermined initial rate of speed by speed controlled moving surfaces which surround, at least partially, and grip such successive portions without flattening to feed the same positively. Similarly, the successive portions of the tubular film which are being molecularly oriented by a radial expansion are advanced longitudinally at a predetermined rate of speed which, preferably, is greater than the initial speed of such portions to thereby provide for longitudinal orientation of the molecules in these portions simultaneously with the orientation thereof in the radial or transverse direction.

The speed controlled moving surfaces are arranged to grip the successive portions of the tubular film, without flattening, at a plurality of areas which are spaced substantially equally about the periphery thereof and which are sufficient in number as to cause all annularly aligned increments of such portions to be advanced positively at the predetermined initial rate of speed. Longitudinal advancement of the successive portions of the tubular film undergoing molecular orientation is achieved, preferably, by flattening or collapsing, as between a pair of driven nip rollers, the leading of such portions after their molecular orientation and quenching. In this manner the gas within the tubular film itself is confined, as an unobstructed column, between the location of extrusion and the location at which the successive oriented, quenched portions of the tubular film are flattened.

The gas under pressure which is applied externally of the successive portions of the tubular film in the cooling zone is chilled and serves also to cool such portions to a temperature within the necessary orientation temperature range concomitantly with their longitudinal advancement. This cooling gas is delivered as a stream which extends annularly about the successive portions of the tubular film and which flows concurrently with the same during their longitudinal advancement. The method of the present invention allows, if desired, a gradual radial expansion of the successive portions of the tubular film during their cooling to within the necessary orientation temperature range, to thereby permit a thinning of the walls of such portions to a predetermined thickness.

The successive portions of the tubular film are at a temperature within the necessary orientation temperature range as they issue from the cooling zone and approach and are engaged by the speed controlled moving surfaces and, at such time, are separated from the annular stream of cooling gas. Once beyond the speed controlled moving surfaces, these particular successive portions of the tubular film undergo radial expansion and molecular orientation under the pressure contained therein. The external pressure acting upon these radially expanding portions is preferably that of the ambient atmosphere; that is, the atmosphere within the room within which the method is being carried out, or an atmosphere maintained about such film portions which is under a pressure less than that of the gas within the tubular film and which is either less or greater than the room atmosphere.

The apparatus of the present invention includes an annular die for extruding a molten thermoplastic material in the form of a continuous tubular film, means for advancing successive portions of the tubular film away from the location of extrusion, means for cooling these film portions only to within a required orientation temperature range while subjecting the same to a predetermined external pressure, and means for providing and maintaining within the tubular film a gas under a pressure which is sufficient to prevent collapse of the successive portions of the tubular film during their cooling and which will cause radial expansion of those portions which are at a temperature within the orientation temperature range.

More particularly, the cooling means includes a chamber disposed directly adjacent to the annular die and through which the successive portions of the tubular film are advanced at a predetermined initial rate of speed by speed controlled moving surfaces which are located outwardly of the end of such chamber remote from the die. A nozzle delivers a stream of cooling gas into this chamber, annularly about the successive portions of the tubular film and under a pressure which is not greater than that of the gas maintained within the tubular film itself. This annular stream of cooling gas flows concurrently with the advancing successive portions of the tubular film and is exhausted from the chamber and into the ambient atmosphere at a location adjacent to the speed controlled moving surfaces.

Within the chamber are arranged a plurality of flat sizing rings which are disposed in spaced, parallel planes which extend at substantially right angles to the axis of the extrusion die. The sizing rings may be of like internal diameter. Alternatively, the internal diameter of successive of such sizing rings may be slightly larger than preceding of such rings which are nearer to the extrusion die. With this array of sizing rings the successive portions of the tubular film, issuing from the annular die and advancing through the cooling chamber, will expand radially until the pressure of the gas maintained within the tubular film is in balance with the forces which resist such expansion, which includes the pressure of the cooling gas flowing across the internal edges of the respective sizing rings.

Openings are provided within the sizing rings to avoid differences in pressure between the cooling gas flowing across the internal edges of such rings and that which is between such rings. These openings also minimize the presence of low or stagnant flow areas within the chamber and thus facilitate consistent cooling of the successive portions of the tubular film. Baffles are disposed between adjacent of the sizing rings to encourage inter- mixing of the different flows of cooling gas and thereby minimize temperature differentials therein.

The speed controlled moving surfaces employed in the apparatus of the present inventional include pairs of positively driven rolls disposed in each of one or more substantially parallel planes which extend at substantially right angles to the axis of the extrusion die. The rolls of each such pair of rolls are parallel to each other and are speced apart as to grip the outer surfaces of the successive portions of the tubular film without flattening the same.

More particularly, the positively driven rolls in the adjacent parallel planes are skewed relative to each other, preferably with the rolls in one of the parallel planes spanning across the adjacent ends of rolls which are located in the adjacent of such planes. Preferably, extending between the ends of adjacent positively driven rolls in the respective parallel planes are idler rolls which minimize distortion in the shape of the successive portions of the tubular film as they are engaged and advanced by the driven rolls and, also, prevent radial expansion of those areas of the successive film portions which are not engaged by but are aligned circumferentially with the driven rolls in the respective parallel planes. The parallel planes containing the speed controlled rolls are spaced from each other and from the cooling chamber only to such extent as to permit unobstructed rotation of such rolls.

The successive portions of the tubular film which have been cooled to within the necessary orientation temperature range expand radially, under the pressure of the gas maintained therein, as they are advanced beyond the speed controlled moving surfaces. The expansion of such film portions at this stage effects orientation of the molecules of the polymeric material in a transverse direction thereof. An annular nozzle is employed for impinging a cooling gas onto the oriented portions of the tubular film while they are in their expanded condition to set the same.

Advancement of the successive portions of the tubular film during their radial expansion is preferably achieved by driven nip rollers which are positioned to flatten or collapse the oriented film portions after they have been quenched. Such nip rollers serve to confine the gas which is delivered into the tubular film and, desirably, are driven at a predetermined rate of speed which is greater than that imparted to successive portions of the tubular film by the speed controlled moving surfaces. Thus, the portions of the film which are being transversely oriented by radial expansion, simultaneously undergo orientation in the longitudinal direction under the influence exerted by the driven nip rollers.

As referred to herein the "orientation temperature range" is the range of temperatures within which orientation of the molecules of the thermoplastic polymeric film may be achieved. This range of temperatures extends from and generally slightly above the second order phase transition temperature of the orientable thermoplastic polymeric material forming the film which is being stretched and below a temperature at which relaxation of the orientation effect by stretching occurs so rapidly that the film retains no significant orientation once stretching ceases. The specific orientation range will vary, of course, with different polymeric materials and can be determined by experimentation or from the prior art. U.S. Pat. 3,141,912, for example, sets forth the specific orientation temperature ranges for a variety of different of such polymeric materials.

As heretofore indicated the term "quenching" designates the cooling of the tubular film to a temperature below the orientation temperature range from which such film is formed, while the term "flattening" is intended to indicate the complete collapsing of the tubular film on itself.

Cooling of the successive portions of the tubular film to within the orientation temperature range as well as quenching of such portions may be achieved with chilled air or other gas. The temperature, rate of flow, period of contact with the tubular film, pressure, etc. of the chilled air within the cooling chamber must be accurately controlled to avoid constriction of the tubular film during the initial cooling thereof and/or to prevent cooling of the same to a temperature below the orientation temperature range prior to their engagement with the speed controlled moving surfaces and subsequent stretching.

The method and apparatus of the present invention are adapted for use with a variety of orientable thermoplastic polymeric materials, such as set forth in the cited prior patents and including, for example, polyesters, such as polyethylene terephthalate; polyamides, such as nylons; polystyrenes and other polyolefins, such as polyethylene and polypropylene; vinyl chloride polymers and copolymers; cellulose esters; rubber hydrochloride and the like.

In the drawing, FIG. 1 is a side view of the apparatus of the present invention;

FIG. 2 is a horizontal section taken along the line II—II of FIG. 1; and

FIG. 3 is a fragmentary view of a portion of the apparatus shown in FIG. 1.

With reference to FIG. 1 of the drawing, character 11 designates an extrusion die having an annular extrusion orifice 13. The die 11 is attached to a conventional extruder, not shown, in which a thermoplastic polymeric material was rendered molten, concomitantly with its continuous advancement through the extruder, and is delivered under pressure to the die orifice 13. This molten polymeric material issues from the die orifice 13 as a continuous tubular film 15, advanced through a chamber 17, which defines a cooling zone, by speed controlled moving surfaces, indicated at 19, and laced inbetween nip rollers 21 which are continuously driven at a uniform rate of speed.

A conduit 23 extends through the die 11 for delivering into the tubular film 15 a gas under a pressure which is greater than that of the ambient atmosphere outwardly of the advancing portions of the tubular film located between the speed controlled moving surfaces 19 and the nip rollers 21. A substantially constant volume of such gas is contained within the tubular film 15 between the extrusion die 11 and the nip rollers 21 and serves to prevent collapse of the successive portions of the tubular film during their passage through the chamber 17, where they are cooled only to within the necessary orientation temperature range, and causes the successive portions of the tubular film which are within such orientation temperature range to expand radially as they are advanced beyond the speed controlled moving surfaces 19 to thus orient the molecules thereof.

While in their radially expanded and now molecularly oriented condition the successive portions of the tubular film are passed through an annular nozzle 25 where they are quenched by a cool gas. A conventional collapsing frame, indicated at 27, serves to gradually urge the successive oriented quenched portions of the tubular film toward a flattened condition as they are advanced toward the nip rollers 21.

The chamber 17 is positioned directly adjacent to the die 11 and includes an outer wall 29, an annular nozzle or ring 31 at its end nearest to the die 11 and, at its opposite end, a wall 33 having a circular opening 35. A cooling gas is delivered under pressure from a suitable source, not shown, into the nozzle 31 through openings 37 and issues from such nozzle through a continuous annular orifice 39, as defined by lips 41 and 43. As illustrated, the nozzle lip 43 is shaped to direct the cooling gas away from the die 11 as it issues from the nozzle orifice 39. Thus, the annular stream of cooling gas discharged from the nozzle 31 flows concurrently with the successive portions of the tubular film as they are advanced through the chamber 17 and is discharged from such chamber at its uppermost end into the ambient atmosphere.

During passage through and without contact with any members within the chamber 17, the successive portions of the tubular film are cooled only to within the necessary orientation temperature range by the cooling gas which flows concurrently with such portions. Generally, the length of the chamber 17 will be fixed and thus to effect cooling within such chamber of the successive portions of the tubular film to within the necessary orientation temperature range, the temperature of the cooling gas and/or its rate of flow through the chamber 17 may need to be varied to suit the particular polymeric material which is being extruded and/or to accommodate for changes in operating conditions, such as the rate of extrusion, the rate of film advancement, film thickness, etc.

High volume and economical production can be achieved with the method and apparatus of the present invention by extruding the tubular film 15 with a wall thickness which is greater than that desired in the film which is to be subsequently oriented by stretching, and then thinning the wall of such extruded film by stretching while it is still in a molten or flowable condition. In view of the condition of the tubular film 15 at this stage, no apparent or significant orientation of the molecules occurs. Stretching of the successive portions of the tubular film will occur within the chamber 17 under the influence of the longitudinal forces applied by the speed controlled moving surfaces 19, which are hereafter described in detail, and also by the radial or transverse pressure which is exerted by the gas contained within the tubular film between the die 11 and nip rollers 21.

Preferably, radial expansion of the still molten or flowable successive portions of the tubular film is effected gradually or progressively with their advancement and cooling to within the necessary orientation temperature range so as to minimize the risk of rupture of the tubular film and to provide for better control over the expansion and cooling thereof. The pressure of the gas combined within the tubular film is maintained substantially constant and, as heretofore mentioned, is such as to effect a desired radial expansion of those portions which have been advanced beyond the speed controlled moving surfaces and are at a temperature within the necessary orientation temperature range. Since all portions of the tubular film within which such gas is contained are under the same internal pressure, the external pressure acting upon those film portions within the chamber 17 is regulated to achieve, at most, a desired controlled radial expansion and thinning of the walls thereof.

With the method and apparatus of the present invention illustrated in the drawing, this effect is achieved by a series of flat sizing rings or disks, denoted by characters 45 through 59, which are arranged within the chamber 17 along spaced, substantially parallel planes extending perpendicular to the axis of the die 11. The respective sizing rings 45 through 59 as well as the chamber wall 33 are each formed with an internal diameter which is slightly larger than the diameter which each successive portion of the tubular film is intended to assume as it is advanced relative thereto, with the internal diameter of the ring 45 being greater than that of the nozzle lip 43 and the rings 47–55 each having an internal diameter which is greater than those of the preceding rings.

With the arrangement described, the cooling gas issues from the nozzle 31 and, during its flow concurrently with the successive portions of the tubular film 15 toward the chamber opening 35, cools the tubular film 15 to within the required orientation temperature range. The cooling gas is introduced into the chamber 17 under a pressure which is greater than that of the ambient atmosphere and, in the preferred mode of operation, less than that of the gas maintained within the tubular film itself. The successive portions of the tubular film will, therefore, expand radially without undergoing any apparent or significant orientation as they are extruded into and travel through the chamber 17 with such expansion being controlled by the sizing rings.

More particularly, as each successive portion of the tubular film is advanced relative to the sizing ring 45, it will expand radially until the forces resisting such expansion, which include the pressure of the cooling gas flowing across the edge of such ring 45, are equal to the pressure of the gas contained within the tubular film itself. Similarly, as each such portion of the tubular film is sequentially advanced relative to the sizing rings 47 through 55 its radial or lateral expansion will be arrested when the forces resisting such expansion, which include the pressure of the cooling gas flowing across the internal edge of the respective rings are equal to that of the gas contained within the tubular film. The internal diameters of the sizing rings 57 and 59 and chamber wall opening 35 are alike and equal to that of the ring 55 and thus no further radial expansion of the successive portions of the tubular film occurs as they travel beyond the ring 55.

The pressure of the cooling gas flowing across the edges of the respective sizing rings, such as the flowing gas indicated by the arrows 61, must remain constant throughout the period of operation to provide the successive portions of the tubular film with consistent characteristics. Likewise, as the temperature of the cooling gas delivered into the chamber 17 is maintained constant, its volume must also remain constant to provide for cooling of the successive portions of the tubular film to within the required orientation temperature range during their travel through such chamber 17. Thus, to avoid subjecting each successive portion of the tubular film to drastic pressure variations during travel through the chamber 17 and to avoid differences in the pressure exerted on the successive portions of the tubular film during extended production operations, the sizing rings as well as the chamber wall 33 are each provided with a series of annularly spaced performations 63 for the passage of cooling gas therethrough. If desired, spaced vents may be provided along the upper portion of the wall 29 to assist in the removal of spent gas from within the chamber 17.

The sizing ring performations 63 permit continuous passage of cooling gas through the sizing rings themselves so that the pressure of the cooling gas flowing across the internal edges of the respective sizing rings will remain substantially constant throughout the operation. Such perforations 63 serve also to prevent stagnant or low flow areas of cooling gas. Preferably, the perforations 63 in adjacent of the sizing rings are in offset relationship; that is, not aligned, to encourage intermixing of the flows of cooling gas as they issue from the perforations in an adjacent sizing ring.

Flat baffle rings 65 are disposed between adjacent of the sizing rings, with the internal edges thereof extending beyond the perforations in the sizing ring which is immediately above the same. Such baffles 65 encourage mixing of the cooling gas which flows through the perforations in the sizing rings with that which flows across the internal edges thereof so as to minimize temperature variations within such cooling gas.

The speed controlled moving surfaces illustrated and indicated at 19 are intended to grip, without flattening, the predetermined initial rate of speed. Such surfaces include pairs of like, spaced rolls 67 and 69 disposed in one common plane and pairs of like spaced rolls 71 and 73 arranged in another common plane. These common planes, indicated at 75 and 77 in FIG. 1, are parallel to each other and extend at substantially right angles to the axis of the die 11. The plane 75 is spaced from the chamber 17 and the planes 75 and 77 are spaced from each other only to such extent as is necessary to permit an obstructed rotation of the rolls in the respective planes. Pairs of spaced rolls may be provided in additional of such planes which are parallel to the planes 75 and 77 if desired or necessary.

As shown in FIG. 2, the axes of the rolls 67 extend at right angles to the axes of the rolls 69, while the axes of the rolls 71 are disposed at right angles to the axes of the rolls 73. However, the rolls 71 and 73 in the plane 77 are arranged to span across the adjacent ends of the rolls 67 and 69 in the plane 75.

The rolls of each pair of rolls are spaced apart to grip the outside surface of the tubular film and are preferably provided with peripheral surfaces formed of rubber or other like material to insure a snug engagement with the film surface without marring the same. Each of the rolls of the respective pairs of rolls includes a shaft 79 which is rotatably supported by suitable bearings, not shown. Bevel gears 81 are fixed to each of the roll shafts 79. As shown in FIG. 2, the bevel gears 81 fixed to the shafts 79 of the rolls 67 mesh with the like gears attached to the shafts 79 of the rolls 69. Likewise, the bevel gears 81 fixed to the shafts 79 of the rolls 71 mesh with the like gears attached to the shafts of the rolls 73. A positive, constant driving force, as indicated by the arrow 83, is applied to the shaft 79 of one of the rolls 67 and a like driving force, indicated at 85 is applied to the shaft 79 of one of the rolls 71 so that all of such rolls are driven at the same predetermined rate of speed.

Idler rolls 87 are supported in the respective planes 75 and 77 by arms 89, which are desirably resilient and which are fixed to bracket 91 attached to the chamber 17 or other stationary structure. The idler rolls 87 in the plane 75 extend between the ends of adjacent rolls 67 and 69, while in the idler rolls 87 in the plane 77 extend between the ends of adjacent rolls 71 and 73. Together the idler rolls minimize distortion of the successive portions of the tubular film as it is engaged and advanced by the rolls 67, 69, 71 and 73 and also, prevent radial expansion of those areas of the successive film portions which are not engaged by but are aligned circumferentially with the rolls 67, 69, 71 and 73. Desirably, the ends of the idler rolls 87 are spaced from the ends of the adjacent rolls 67, 69, 71 and 73 only to such extent as to insure unobstructed rotation of all of such rolls. The surfaces, at least, of the idler rolls 87 are formed of Teflon or other similar material to prevent sticking of the tubular film thereto.

The nip rollers 21 are positively driven continuously and at a constant speed by suitable means, not shown. Preferably, the rollers 21 are driven at a predetermined rate of speed which is greater than that imparted to the successive portions of the tubular film by the speed controlled moving surfaces 19. The snug engagement of the successive portions of the tubular film by the speed controlled moving surfaces 19 isolate longitudinal tensions applied by the nip rollers 21 to only those film portions which are between the speed controlled moving surfaces 19 and nip rollers 21. In this manner, the successive portions of the tubular film which are within the necessary orientation temperature range are stretched and oriented in their longitudinal direction simultaneously with their expansion and orientation in the radial or transverse direction.

For a better understanding of the present invention, reference is made to the following example:

Using an apparatus as shown in FIG. 1, polyvinyl chloride resin, which had been dry blended with about 16.0%, by weight, of epoxized soy bean oil and dioctyl adipate as plasticizers, was fed into the barrel of an extruder which was heated to a temperature of 175° C. to render the same molten. This molten resin was advanced through the barrel by a 2½" diameter screw with a length-to-diameter ratio of 24 to 1 and was extruded upwardly through the die 11 which had a 6" diameter orifice 13 with a 20 mil gap.

The successive portions of the tubular film 15 issuing from the die orifice 13 were passed into the chamber 17 into which air at a temperature of about 5° C. was delivered by the nozzle 31 and 900 cubic feet per minute. This chamber 17, together with the nozzle 31 therein was 20 inches in height and included a series of sizing rings each having twelve equally spaced perforations 63 of 1" in diameter, with the perforations in adjacent of such rings being offset about 3° from each other. The sizing rings were about ½" in thickness, with the ring nearest to the nozzle 31 having an internal diameter of 10½"; the next two rings having internal diameter of 11¼" and 12¼", respectively; and the remaining rings having internal diameters of 14 inches. Baffles 65 were positioned between and spaced ¾ inch from adjacent sizing rings, each baffle having a thickness of ¼ inch and having an internal diameter as to extend slightly beyond the perforations 63 in the sizing ring immediately above the same.

Within the cooling chamber 17, the successive portions of the tubular film 15 were gradually expanded to a 10 inch diameter by air under pressure contained within the tubular film, with the thickness of such film portions being reduced during such radial expansion to a thickness of about 3.30 mils.

The successive portions of the polyvinyl chloride film, cooled to within an orientation temperature within the range of from about 80° C. to 149° C. within the chamber 17, were advanced by the speed controlled moving surfaces at a speed of 60 feet/min., while the nip rollers were driven at a speed of 121 feet/min. The longitudinal stretch or orientation ratio of such film portions was thus 2.01. Simultaneously, with such longitudinal stretching, these film portions were expanded radially by the gas contained therein to a diameter of 22 inches or stretch ratio of 2.2.

The oriented successive portions of the tubular film were cooled by air at a temperature of 5.0° C. discharged from the nozzle 25 and then collected. The resulting film had a thickness of 0.75 mil and a sample thereof subjected to air at a temperature of 104° C. for five seconds exhibited the following shrink characteristics:

|  | Grams tension per 6" width | Percent shrinkage |
| --- | --- | --- |
| Machine direction | 350 | 29.5 |
| Transverse direction | 390 | 32.0 |
| Overall |  | 52.0 |

It is to be understood that changes and variations may be made without departing from the spirit and scope of the invention as defined in the appended claims.

I claim:

1. A method including the steps of extruding molten thermoplastic polymeric material in the form of a continuous tubular film, cooling successive portions of the extruded tubular film only to within an orientation temperature range within a cooling zone having an entrance and exit, at a location closely adjacent to the exit of the cooling zone gripping without flattening the successive cooled portions of the tubular film and positively advancing the same at a predetermined initial rate of speed to urge the successive portions of the tubular film away from the location of extrusion, through the cooling zone, and directly into an ambient atmosphere outwardly of such zone, from the location of extrusion maintaining within the successive portions of the tubular film a gas which is under a pressure greater than that of the ambient atmosphere, during passage through the cooling zone subjecting the external surfaces of the successive portions of the tubular film to a pressure not greater than the pressure of the gas maintaned within such portions whereby the pressure of the gas within the successive portions of the tubular film which are beyond the location at which they are gripped and positively advanced and are within the ambient atmosphere causes such portions to expand radially and be molecularly oriented in a transverse direction, quenching the successive expanded portions of the tubular film to a temperature below the orientation temperature range, and longitudinally advancing the successive quenched portions of the tubular film at a rate of speed which is greater than the initial rate of speed to cause the successive portions of the tubular film which are at a temperature within the orientation temperature range to be stretched and molecularly oriented in a longitudinal direction concomitantly with the transverse orientation thereof.

2. A method as defined in claim 1 wherein the successive portions of the tubular film are gripped and positively advanced at the location closely adjacent to the exit of the cooling zone by speed controlled moving surfaces which at least partially surround such successive portions.

3. A method as defined in claim 1 wherein the successive quenched portions of the tubular film are flattened to confine therein an unobstructed column of gas between the location of extrusion and the location at which the successive quenched portions of the tubular film are flattened.

4. A method as defined in claim 1 wherein the successive portions of the tubular film within the cooling zone are expanded radially during passage through such zone to thin the walls thereof without significantly molecularly orienting the same.

5. A method as defined in claim 1 wherein the successive portions of the tubular film within the cooling zone are cooled to within the orientation temperature range by a stream of cooling gas under pressure which surrounds and flows concurrently with such portions as they are advanced away from the location of extrusion, and wherein such stream of cooling gas is separated from the successive portions of the tubular film at the exit of the cooling zone.

6. A method as defined in claim 2 wherein the successive portions of the tubular film are gripped and positively advanced by the speed controlled moving surfaces at a plurality of substantially equally spaced areas disposed circumferentially thereof.

7. Apparatus for making oriented tubular film including a die having an annular orifice for extruding molten thermoplastic polymeric material in the form of a continuous tubular film, means positioned directly adjacent to said die for cooling successive portions of the extruded tubular film only to within a necessary orientation temperature range and for subjecting such successive portions of the tubular film to a controlled external pressure during the cooling thereof, first driven means positioned directly adjacent to said cooling means for gripping without flattening the successive portions of the tubular film and positively advancing the same longitudinally at a predetermined initial rate of speed, means for delivering a gas under pressure into the extruded tubular film to prevent the collapse thereof during passage relative to said cooling means and to cause the successive portions of the tubular film to expand radially and be molecularly oriented in a transverse direction as they travel beyond the location at which they are gripped and positively advanced, means for quenching the successive oriented portions of the tubular film to a temperature below the orientation temperature range while such portions are in their expanded condition and second driven means spaced from said first driven means and positioned to engage with the successive quenched portions of the tubular film for positively advancing the same in a longitudinal direction at a speed greater than the initial rate of speed.

8. Apparatus as defined in claim 7 wherein said first driven means includes positively driven speed controlled moving surfaces which at least partially surround the successive portions of the tubular film.

9. Apparatus as defined in claim 8 wherein said second driven means includes a pair of nip rollers which flatten the successive quenched portions of the tubular film and serve to contain within the tubular film the gas under pressure delivered therein and means for driving said nip rollers at a predetermined rate of speed which is greater than that of said speed controlled moving surfaces.

10. Apparatus as defined in claim 8 wherein said speed controlled moving surfaces includes pairs of rolls disposed in at least one plane which extends at substantially right angles to the axis of said die, with the rolls of each such pair of rolls being disposed in parallel and spaced apart relationship to grip snugly the outer surface of the tubular film without flattening the same, and means for positively driving all of the rolls of said pairs of rolls at substantially the same predetermined rate of speed.

11. Apparatus as defined in claim 8 wherein said speed controlled moving surfaces includes pairs of rolls disposed in each of a plurality of parallel planes which extend at substantially right angles to the axis of said die, the rolls of each such pair of rolls being disposed in parallel and spaced apart relationship to grip snugly the outer surface of the tubular film without flattening the same, with the pairs of rolls which are disposed in one of such parallel planes being arranged with the axes thereof extending at an angle to the axes of the pairs of rolls which are disposed in an adjacent of such parallel planes, and means for positively driving all of the rolls of said pairs of rolls at substantially the same predetermined rate of speed.

12. Apparatus as defined in claim 11 further including idler rolls positioned in the respective parallel planes between the ends of the adjacent positively driven rolls in such planes.

13. Apparatus as defined in claim 10 wherein two pairs of said rolls are disposed in each of at least two substantially parallel planes which extend at right angles to the axis of said die, the axes of the pairs of rolls in the respective planes being disposed at substantially right angles to each other with the rolls in one of such planes being located as to span across the ends of adjacent rolls located in another of such planes.

14. Apparatus as defined in claim 7 wherein said cooling means includes a chamber, openings in the opposite ends of said chamber which are concentric with the axis of said extrusion die, means positioned within said chamber adjacent to its opening nearest to said die for delivering a stream of cooling gas under pressure annularly about the tubular film and in the direction of its passage as it is extruded from said die and enters into said chamber, and a plurality of flat sizing rings each of which is disposed in an individual plane of a plurality of substantially parallel planes which are spaced longitudinally of said chamber and extend at substantially right angles to the axis of said die, each of said sizing rings being concentric with the die axis and having an internal diameter which is greater than that of said die orifice.

15. Apparatus as defined in claim 14 wherein the internal diameter of each successive sizing ring extending in the direction of extrusion is at least equal to that of the immediately preceding sizing ring.

16. Apparatus as defined in claim 15 further including perforations extending through said sizing rings, with the perforations in each of said sizing rings being offset annularly relative to the perforations in adjacent of said sizing rings.

17. Apparatus as defined in claim 16 further including a flat, annular baffle positioned between each pair of adjacent sizing rings in concentric relationship with the axis of said die, each of said baffles having an internal diameter which is less than the internal diameter of the sizing rings between which it is positioned, with its internal edge extending at least to the perforations in the immediately succeeding sizing ring.

18. Apparatus for cooling an extruded tubular film formed of molten thermoplastic material including a chamber having an entrance and exit opening in the respective opposite ends thereof, said entrance and exit openings having a common axis along which an extruded tubular film of molten thermoplastic material is adapted to be advanced, means immediately adjacent to said chamber entrance opening for delivering an annular stream of cooling was under pressure toward said exit opening for surrounding the outer surface of a tubular film of molten thermoplastic material and cooling the same as it is advanced through said chamber, a plurality of flat sizing rings each of which is disposed in an individual plane of a plurality of substantially parallel planes which are spaced longitudinally of said chamber and extend at substantially right angles to the common axis of said entrance and exit openings, each of said sizing rings being concentric with the common axis of said entrance and exit openings and having an internal diameter which is greater than that of the outside diameter of the extruded tubular film of molten thermoplastic material which is to be cooled within said chamber, and a plurality of equally spaced perforations extending through the respective sizing rings with the perforations in each of said sizing rings being offset angularly relative to the perforations in the sizing rings which are adjacent thereto.

19. Apparatus as defined in claim 18 wherein the internal diameter of each successive sizing ring extending between the entrance and exit opening of said chamber is at least equal to that of the immediately preceding sizing ring, and further including a flat, annular baffle positioned between each pair of adjacent sizing rings, each of said baffles being concentric with the common axis of the entrance and exit openings and having an internal diameter which is less than the internal diameters of the sizing rings which it is positioned, with its internal edge extending at least to the perforations in the immediately succeeding sizing ring.

20. Apparatus as defined in claim 19 wherein a plurality of successive sizing rings nearest to said chamber entrance opening are formed with different internal diameters, with the diameter of each successive sizing ring of such plurality of sizing rings having an internal diameter larger than the immediately preceding sizing ring.

References Cited

UNITED STATES PATENTS

| | | | |
|---|---|---|---|
| 3,091,807 | 6/1963 | Turner et al. | 264—95 |
| 3,544,667 | 12/1970 | Ebert et al. | 264—95 |
| 3,548,042 | 12/1970 | Hinrichs | 264—95 |
| 3,568,252 | 3/1971 | Masuda et al. | 264—95 |
| 3,217,361 | 11/1965 | Ryan et al. | 264—95 |
| 3,472,924 | 10/1969 | Seperlund et al. | 264—95 |
| 2,852,813 | 9/1958 | Longstreth | 264—146 |
| 3,635,634 | 1/1972 | Nagano et al. | 264—95 |

FOREIGN PATENTS

| | | | |
|---|---|---|---|
| 1,423,754 | 11/1965 | France | 264—95 |

ROBERT F. WHITE, Primary Examiner

J. R. THURLOW, Assistant Examiner

U.S. Cl. X.R.

165—174; 264—95, 209, 210 R, 237; 425—72, 326

UNITED STATES PATENT OFFICE
CERTIFICATE OF CORRECTION

Patent No. 3,775,523      Dated Nov. 27, 1973

Inventor(s) Harold A. Haley

It is certified that error appears in the above-identified patent and that said Letters Patent are hereby corrected as shown below:

Col. 4, line 4, "inventional" should read --invention--.
Col. 6, line 37, "combined" should read --contained--.
Col. 7, line 37, "performations" should read --perforations--; line 41, "performations" should read --perforations--; lines 50 & 51, "perforations in an adjacent sizing ring." should read --perforations 63 in one of such rings and travel toward the perforations in an adjacent sizing ring.--; line 62, "predetermined initial rate of speed." should read --successive portions of the tubular film and advance the same at a predetermined initial rate of speed.--; line 70, "an obstructed" should read --unobstructed--. Col. 8, line 25, "bracket" should read --brackets--. Col. 9, line 6, "diameter" should read --diameters--; line 15, "by air" should read --by an air--; "within" should read --with--. Col. 12, line 9, "was" should read --gas--; line 25, "angularly" should read --annularly--; line 36, "rings which" should read --rings between which--.

Signed and sealed this 16th day of April 1974.

(SEAL)
Attest:

EDWARD M.FLETCHER,JR.
Attesting Officer

C. MARSHALL DANN
Commissioner of Patents